(12) United States Patent
Hanna et al.

(10) Patent No.: US 6,453,702 B1
(45) Date of Patent: Sep. 24, 2002

(54) FIBERIZING APPARATUS AND METHOD

(75) Inventors: Terry Joe Hanna, Millersport, OH (US); Russell Donovan Arterburn, Athens, TN (US); James Melvin Higginbotham, Granville, OH (US)

(73) Assignee: Johns Manville International, Inc., Denver, CO (US)

( * ) Notice: Subject to any disclaimer, the term of this patent is extended or adjusted under 35 U.S.C. 154(b) by 188 days.

(21) Appl. No.: 09/675,591

(22) Filed: Sep. 29, 2000

(51) Int. Cl.[7] .............................................. C03B 37/07
(52) U.S. Cl. .............................. 65/384; 65/475; 65/495
(58) Field of Search .......................... 65/384, 495, 494, 65/475, 496

(56) References Cited

U.S. PATENT DOCUMENTS 3,056,846 A * 10/1962 Glaser ........................ 65/499
3,988,135 A * 10/1976 Coggin ....................... 65/499
4,155,732 A    5/1979 Schlachter et al. ............... 65/1
4,337,075 A    6/1982 Mechel et al. .................. 65/12
4,612,027 A    9/1986 Marra ........................ 65/1
6,196,029 B1 * 3/2001 Melia ......................... 65/495
6,221,506 B1 * 4/2001 Guerlet ....................... 65/495
6,272,887 B1 * 8/2001 Sullivan ...................... 65/495

FOREIGN PATENT DOCUMENTS

SU            618346      *  8/1978  .................. 65/499

* cited by examiner

Primary Examiner—John M Hoffmann
(74) Attorney, Agent, or Firm—Robert D. Touslee

(57) ABSTRACT

A fiberizing apparatus for converting molten material into continuous fibers having an improved internal support structure to minimize high temperature creep and sagging of the tip plate or orifice plate is disclosed. The preferred internal support structure is welded to the sidewalls and the top surface of the tip plate and is comprised of a plurality of internal intersecting supports that form a diamond shaped structure. A method of fiberizing a molten material using the fiberizing apparatus is also disclosed.

34 Claims, 11 Drawing Sheets

FIBERIZING APPARATUS AND METHOD

The present invention involves an improved bushing apparatus for making fibers, particularly glass fibers and an improved method of making and using glass fiberizing bushings.

In the manufacture of continuous fibers from a molten material like molten glass, the molten material is often generated by a tank furnace and distributed to a plurality of fiberizing bushings via one or more channels and one or more bushing legs connected to the channel(s). Each bushing leg comes off the channel at about 90 degrees and contains a plurality of bushings that are spaced apart.

Precious metal bushings made from alloys of platinum and rhodium and used for making continuous glass fibers are well known, having been in use for more than 50 years. Many types of bushings exist for converting molten glass into continuous glass fiber and products. Typical types of bushings are shown in U.S. Pat. Nos. 3,512,948, 4,155,732, 4,272,271 and 4,285,712, the disclosures of which are hereby incorporated by reference. All the bushings shown in these patents teach the use of a perforated plate or screen, welded to the endwalls and sidewalls at some distance above a tip plate containing hundreds or thousands of nozzles or tips where molten glass first emerges from the bushing and is converted to continuous glass fibers by cooling and drawing, attenuating, in a known manner. Some of these patents teach various means of reinforcing the tip or orifice plate through which the molten material flows to form fibers. The bushings are electrically heated by their own resistance and are box-like, open on the top and comprise an orifice plate containing many orifices or tips welded therein, side walls, end walls, terminals on the end walls for connecting electrical cables, a top flange for contacting the underneath side of a forehearth, and usually a perforated plate or screen parallel with, but mounted above, the orifice plate. Usually the bushings are made by cutting the parts from alloy of desired thickness and welding the parts together with similar alloy, but a part or all of the bushing can be made by casting as is known.

These bushings work well as long as the tip plate remains fairly flat. At the high temperature at which these bushings operate, usually above 2000 degrees F., the platinum-rhodium alloy tip plate creeps (stretches permanently under load) and sags with time until the amount of sag becomes so great that it is no longer possible to cool the tips and the molten glass forming the fibers below the tips sufficiently uniformly, at which time the break rate of fibers becomes very high and uneconomical. Very soon after the first fiber breaks out on a bushing making E glass, the most common glass used to make continuous fiber products, all of the fibers break out in a chain reaction due to one or more beads of molten glass falling from the broken out tip into the array of fibers from the other tips.

It is common practice to support tip plates from below the bushing with linear supports between rows of tips at one or more locations. These linear supports usually run down the length of the tip plate and must be a refractory and electrically insulating material or separated from the bushing with such a material.

In spite of the supports, the portions of the tip plate between the supports still sags and causes the temperature profile of the tip plate to be non-uniform because it causes tips to be different distances away from the cooling means commonly used such as finned cooling tubes or cooling fins. When this happens, portions tip plate, and tips therein, that have sagged the least run considerably hotter than the tips in the portions of the tip plate that have sagged the most because of the distance between the tips and the cooling means.

Since the heat transfer at these very hot temperatures is very dependent on the distance between the hot surface and a cold surface, distance variations are very critical to keeping the molten glass within an acceptable temperature range and viscosity to maintain fiberization, particularly in larger bushings containing 1600 or more tips or orifices. When tips, due to sag, get very close or touch a cooling tube or fin, the cooling rate causes the molten glass to cool excessively resulting in a viscosity so high that the fiber either breaks in the attenuation zone below the tip or in a much smaller diameter fiber which is broken more often due to defects in the molten glass that cause a higher break rate as the fiber diameter becomes smaller. Also, even if the cooling in the vertically lowest tips is not so great that too frequent breaks occur, nevertheless the fiber diameters generated from those tips are out of specification to the low side making the fiber diameter distribution from the entire bushing undesirable or unacceptable to the customers.

The cooling means can be adjusted some to compensate for sagging tip plates and tip ends being at a different level in different portions of the bushing, but this requires great skill in very uncomfortably hot conditions. Because of this and the proximity to surfaces that will produce severe burns, adjustments are not made as often as they should be. Also, frequently the bushing tips are damaged during such adjustments causing excessive fiber breaks from those tips and/or necessitating that those tips be crimped shut, reducing the productivity of the bushing. When this becomes uneconomical, the bushing must be shut down, removed and a new bushing installed. Often, for some time before the bushing is changed out, the bushing runs at a significantly lower productivity than a new bushing that has not yet sagged significantly.

It is very expensive to replace a bushing. As a result of development, large bushings of 3000 or more tips, such as 4000 or more tips, are now used for making the majority of the tonnage of continuous glass fiber produced today. Such bushings cost several thousands of dollars to fabricate even though the precious metal from removed bushings is recycled. A typical large producer will have more than 200 of such bushings in production. In addition to the fabrication cost of a new bushing, the labor, lost production and other damage to the forehearth and adjacent bushings adds substantial additional costs to the total cost of removing an inoperative bushing and installing a new bushing. These costs typically amount to more than $5,000 per bushing change.

It would be very advantageous to find a way to prevent, or substantially retard the rate of, tip plate sagging, thus extending the production time and average productivity or fiberizing efficiency of each bushing. The fiberizing efficiency is the percentage of time that the bushing is producing good fiber product compared to the total time the bushing is operating e.g. an operating efficiency of 94 percent means that the bushing is producing good fiber product 94 percent of the total time that the bushing is at operating temperature.

SUMMARY OF THE INVENTION

It is an object of the present invention to significantly reduce the rate of sag of tip or orifice plates on precious metal bushings improving the temperature consistency of the molten material exiting the tips or orifices in the tip or orifice plate of the bushing at over 1800, preferably 1900 degrees F. during the life of the bushing and to increase the average fiberizing efficiency over the life of the bushing and to increase the life of the tip or orifice plates of the bushing.

Another object of the invention is a process of making fiber from a molten material by flowing the molten material through holes and/or nozzles in an orifice plate of an electrically heated bushing that has a tip or orifice plate that resists sagging better than prior art bushings and that results in a better average efficiency during the normal bushing life than has been experienced with prior art processes.

Another object of the invention is a bushing used for, and a method of, making continuous glass fiber products that result in glass fibers having a lower variation of fiber diameters in the array of fibers coming from the bushing.

Another object of the invention is a process of making a precious metal bushing for producing continuous fiber products by installing a novel tip plate reinforcing structure.

These objects are accomplished in the fiberizing bushings of the present invention by using a tip plate or orifice plate reinforced with internal reinforcing members, internal supports, welded to the top surface of the tip or orifice plate along at least portions of the lower edge(s) of the supports in the fiberizing bushings. Preferably, one end of each of four of the internal reinforcing members, supports, being welded to an inside corner of the bushing with the other end of each reinforcing member being welded to an opposite sidewall of the bushing. The supports intersect or cross one another and form one angle of significantly less than 90 degrees with at least one sidewall of the bushing. This angle can be 60 degrees +/–20 degrees, but is preferably about 60 degrees +/–15 degrees and most preferably 60 degrees +/–10 degrees and 60 degrees +/–5 degrees is particularly effective. The bushing tip or orifice plate is round, oval or generally oval, square or preferably rectangular in that portion containing the internal reinforcing supports, and preferably a bushing screen contacts the reinforcing members, at least down the center portion of at least most of the length of the bushing, the width of the screen contact portion to be at least about 25 percent of the width of the bushing in the portion of the bushing containing internal reinforcement members.

The length of the bushing is the dimension of greatest magnitude in that portion of the bushing containing the internal reinforcing members and the width of the bushing is the dimension of the bushing perpendicular with the length, parallel with the orifice or tip plate and in that portion of the bushing containing the reinforcing members, the width not being in the direction of the thickness of the tip plate. The screen can contact the entire top length of all reinforcing members or internal supports from sidewall to sidewall and from end wall to end wall, but preferably contacts the top edges of only the central portion of the many of the internal supports from one endwall to the other endwall. The internal supports intersect each other and preferably these intersections are located directly above the areas where the orifice plate or tip plate is supported by linear external support bars, usually of a ceramic material. Typically each internal support is spaced within four inches of another, preferably parallel, internal support, preferably within about three inches and most preferably within about 2 inches or less.

Preferably the fiberizing bushing of the present invention also has external supports contacting an external surface of the tip plate or orifice plate, and preferably these external supports run down the length or most of the length of the tip plate or orifice plate. These external supports are known in the art and can be of the type disclosed in U.S. Pat. No. 4,356,016 or can be sintered high alumina shapes of the type shown in FIGS. 2 and 2A, preferably having an alumina content of at least about 72 percent with the remainder being mainly silica or magnesia.

The invention also comprises a method of making fiber from a molten material, preferably molten glass, by flowing the molten material into an electrically heated, precious metal alloy fiberizing bushing having, at least one generally vertical side wall, an orifice/tip plate having holes therein and internal reinforcing members thereon, and a perforated plate mounted in the bushing above the orifice/tip plate, and causing the molten material to flow through the holes whereby fibers are formed below the bushing in a continuous manner, the improvement comprising reinforcing members being welded to the tip or orifice plate along at least portions of the lower edge(s) of at least most, and preferably all, of the internal reinforcing members or supports, one end of each of four of the internal reinforcing members being welded to an inside corner of the bushing with the other end being welded to an opposite sidewall of the bushing. The internal reinforcing members form an angle with at least one sidewall that is significantly less than 90 degrees and preferably intersect each other. This angle can be 60 degrees +/–20 degrees, but is preferably about 60 degrees +/–15 degrees and most preferably 60 degrees +/–10 degrees and 60 degrees +/–5 degrees is particularly effective. Preferably these intersections are located directly above the areas where the orifice plate or tip plate is supported by linear external support bars, usually of a ceramic material.

The bushing tip or orifice plate is round, oval or generally oval, square or rectangular in that portion containing the reinforcing members, preferably rectangular, and preferably a bushing screen contacts the reinforcing members, at least down the center portion of at least most of the length of the bushing. Normally the bushing would have two sidewalls and two endwalls, but two or all of these can be combined into a single wall, such as where the bushing is circular, oval, etc.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION

Figure 1:
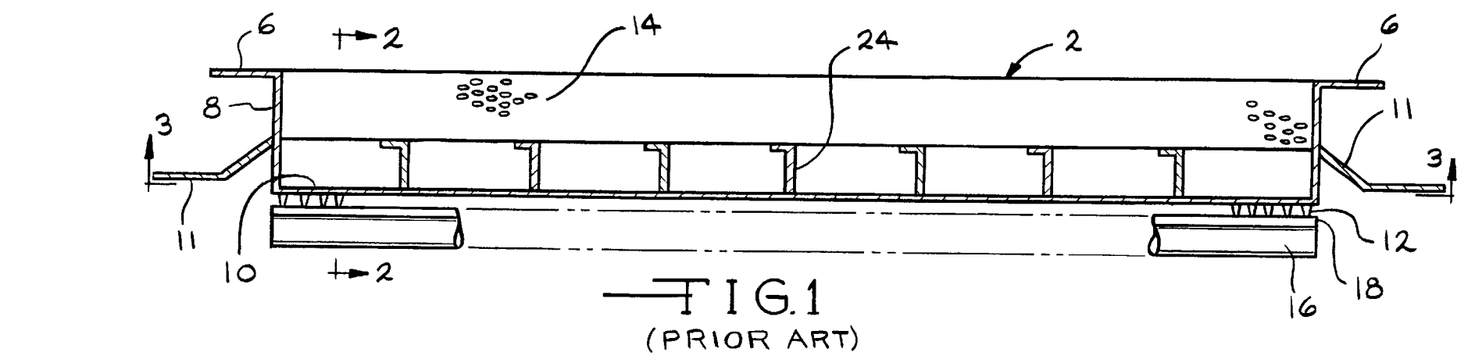
FIG. 1 is a crossectional view along the length of a typical prior art bushing along line 1—1 shown in FIG. 2.
Figure 2:
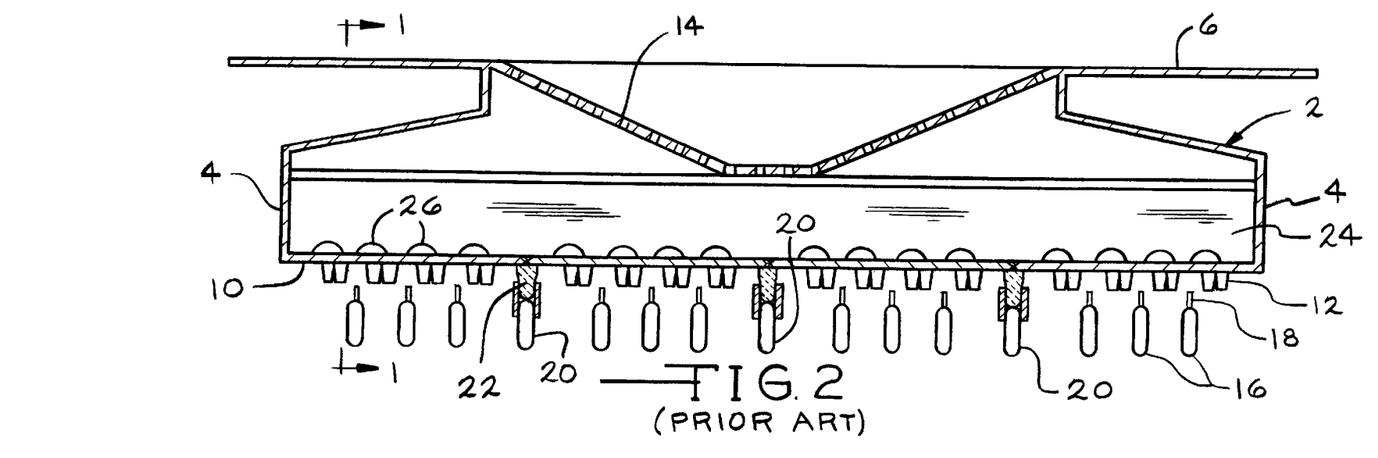
FIG. 2 is a crossectional view along the width of the typical prior art bushing along plane 2—2 shown in FIG. 1.
Figure 3:
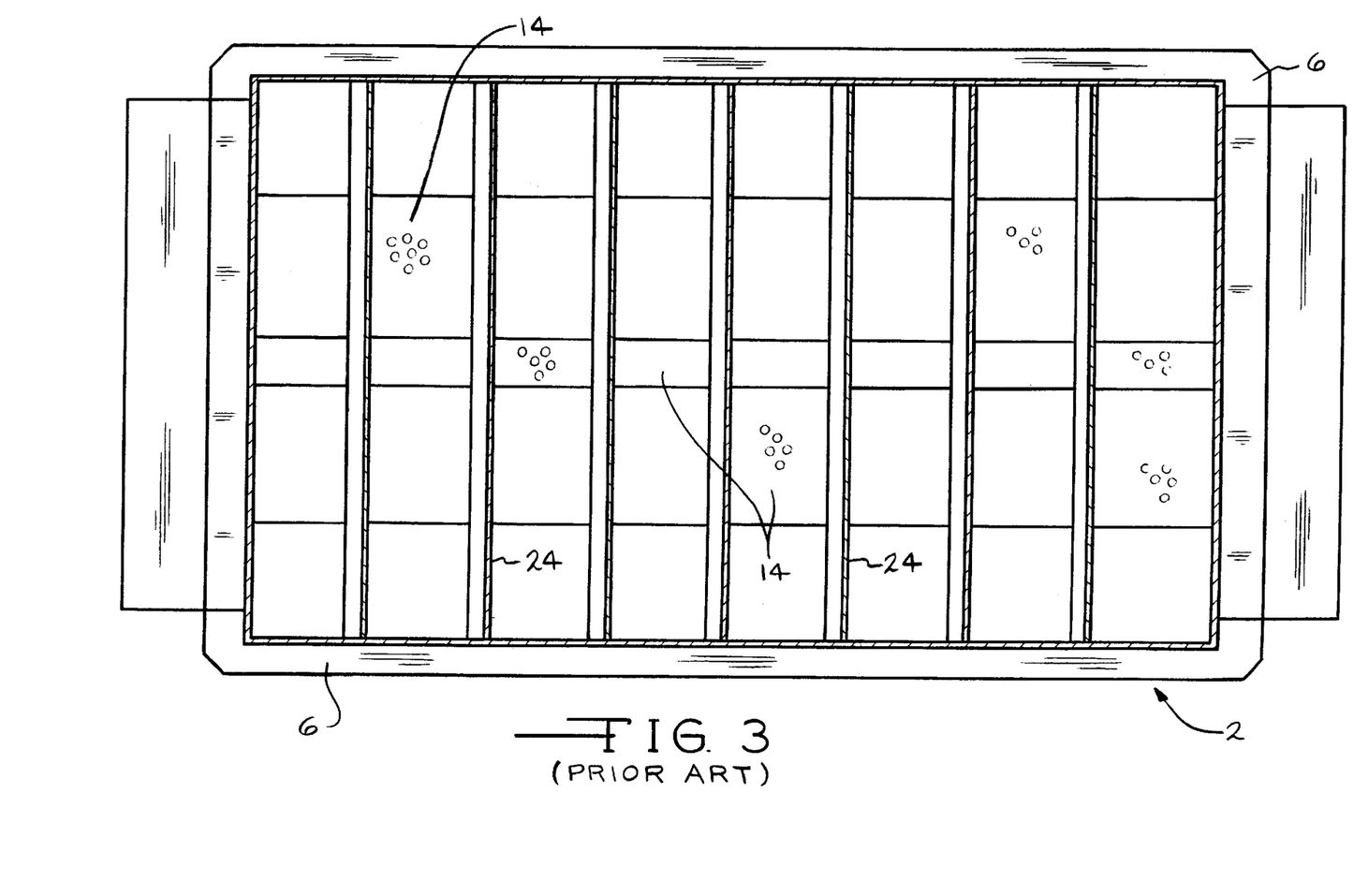
FIG. 3 is a crossectional plan view of the prior art bushing taken along plane 3—3 shown in FIG. 1.

A typical large prior art bushing is shown in FIGS. 1–3. FIG. 1 is a cross-section through the length, see 1—1 of FIG. 2, of a typical prior art precious metal bushing and related hardware used to form glass fiber from molten glass. The bushing is made from a platinum/rhodium alloy having a rhodium content ranging from ten to about thirty percent, typically 20–22 percent. The bushing 2 comprises two sidewalls 4 (see FIG. 2), a flange 6 that extends around the entire upper periphery of the bushing and that is welded to the upper edges of the sidewalls 4 and the upper edges of two endwalls 8, an orifice plate 10 having rows of orifices (not shown) welded to the sidewalls 4 and endwalls 8. A terminal or ear 11 is welded to the exterior of each end wall 8 for connecting the bushing 2 to electrical power in a known manner.

A plurality of hollow nozzles or tips 12 are formed in or welded to the orifice plate 10 in or around the orifices. Normally, tips are arranged in rows down the length or along the width of the bushing. In the bushings shown here, the tips 12 are arranged in pairs of rows, staggered, running along the length of the bushing in a known manner, e. g. as shown in U.S. Pat. No. 4,337,075, which disclosure is hereby incorporated by reference. A perforated plate or screen 14 having a plurality of openings 20 therein is mounted to the endwalls 8 and sidewalls 4 of the bushing and is spaced above the orifice plate 10 for the purpose of catching any pieces of refractory or foreign material coming with the molten glass from the forehearth and to reduce variations in the temperature of the molten glass passing therethrough.

A plurality of cooling tubes 16 are spaced below the orifice plate 10 and between double rows of tips 12. The cooling tubes 16 have at least one fin 18 on top of the tubes 16 for cooling the tips 12 and molten glass and fibers that are formed at the end of the tips 12 when the bushing is operating. Some of the cooling tubes can have a double fin in a known manner such as tubes 20. A ceramic linear support 22 lays on each tube 20 and extends to the bottom surface of the orifice plate 10 in a known manner to provide support for the orifice plate 10 in the manner disclosed in U.S. Pat. No. 4,356,016, the disclosure of which is incorporated herein by reference. Large bushings use at least one of the double fin cooling tubes 20 and ceramic supports 22. The cooling tubes are supported in a well known manner, such as disclosed in U.S. Pat. No. 5,244,483. While the cooling tubes shown here are rectangular with radiused ends in cross-section, they can be oval, round, square, or rectangular, etc. as is well known.

The orifice plate 10 is further strengthened internally with a plurality of interior angle shaped reinforcing members 24 running across the width and spaced along the length of the bushing with their bottom edges attached to the orifice plate, usually welded to the top surface of the orifice plate 10 between the double rows of orifices. The internal supports have cutouts 26 above the orifices so as to not impede the flow of molten glass into the orifices.

When the bushing is installed, the upper surface of the flange 6, which extends uninterrupted entirely around the upper periphery of the bushing, will contact, and be held against an orifice block (not shown) in a known manner, with well known devices not shown here, on the bottom of a forehearth.

This prior art bushing design is applicable to a wide variety of bushing sizes and types, such as on bushings having up to 4000 or more nozzles or tips and performs very good until the orifice plate 10, and tips 12, sag down between the supports 22. This happens too soon, particularly on larger bushings having about 2000 or more tips, such as about 4000 or more tips, in spite of the presence of the reinforcing members 24. Because of the tendency of the platinum/rhodium alloy to creep at the high temperatures, usually over 2000 degrees F., the orifice plate sags and the internal reinforcing supports 24 also creep or stretch and warp, reducing their reinforcing effectiveness.

The orifice plate 10 doesn't sag uniformly in service. It sags very little, if at all, at the supports 22 and near the walls of the bushing, and sags the most in the central portions between supports. This situation means the ends of the tips 12 are at vastly different levels, and also as the orifice plate sags at different amounts, this causes some of he tips 12 to cock sideways. Both of these actions cause the tips to be at various distances from the cooling tube fins 18 and thus to be cooled different amounts. This is undesirable causing fiber breaks and variation in the diameter of the fibers.

The cooling tubes 16 and the fins 18 can be intentionally bent to partially compensate for the sagging of the orifice plate 10, but this is difficult, uncomfortable and therefore is not always done properly or timely resulting in a loss in a large loss in fiberizing efficiency and damage to the bushing. Even when done properly and timely, the fiberizing efficiency still falls off significantly. Also, when the sagging reaches a certain amount, the tubes 16 and fins 18 cannot be bent any further, usually in a matter of months, and the fiberizing efficiency drops to an uneconomical level necessitating a costly bushing change out.

Figure 4:
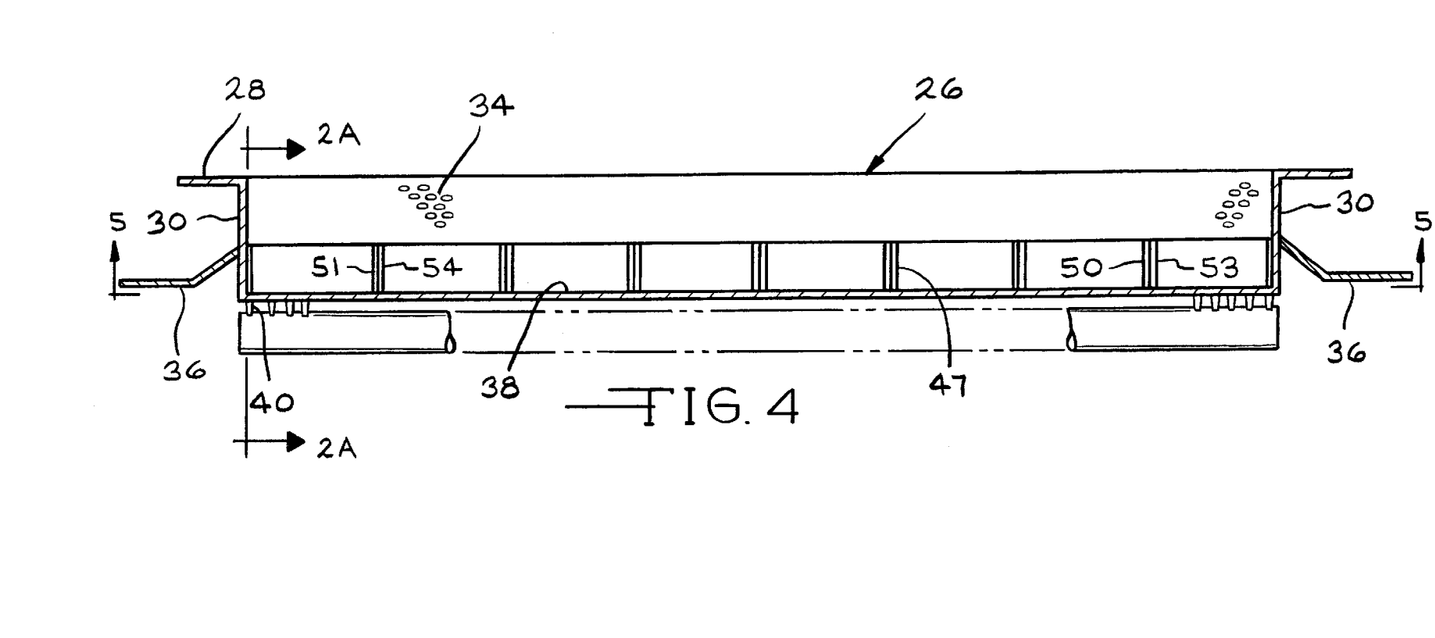
FIG. 4 is a crossectional view along the length of the preferred embodiment of the present inventive bushing taken along plane 4—4 shown in FIG. 2A.

FIGS. 2A and 4–10 show embodiments of the present invention. The bushing size and tip spacing is unchanged from the prior art bushings. FIGS. 2A, 4, 5, 6, 6C, 7 and 7C show the preferred bushing embodiment of the present invention. FIG. 4 is a length cross section of the inventive bushing taken along the plane 4—4 of FIG. 2A. The bushing 26 differs from the prior art bushing 2 in FIGS. 1–3 only in the shape and location of internal reinforcement supports 50, 51, 53 and 54 that are welded to the top surface of the orifice or tip plate 38 as will be described below, but this difference results in bushings that perform in a substantially superior manner to prior art bushings, particularly in bushings having 1600 or more orifices, with or without the same number of tips. Some bushings don't have tips, but at most raised areas around each orifice on the bottom side of the orifice plate. When tips are used the plate.

Figure 2A:
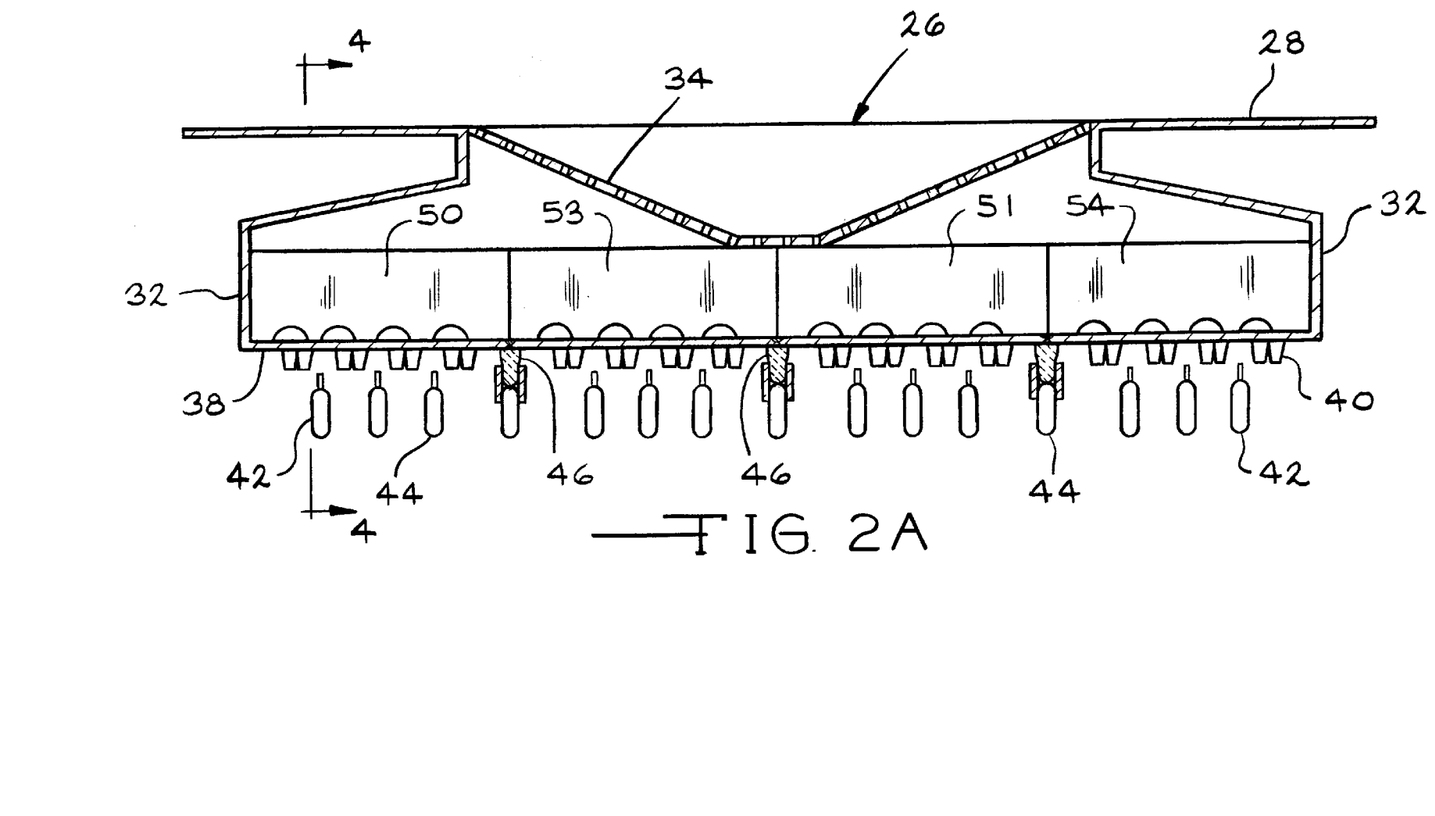
FIG. 2A is a crossectional view along the width of a bushing according to the preferred embodiment of the present invention and taken along the plane 2A—2A in FIG. 4.
Figure 5:
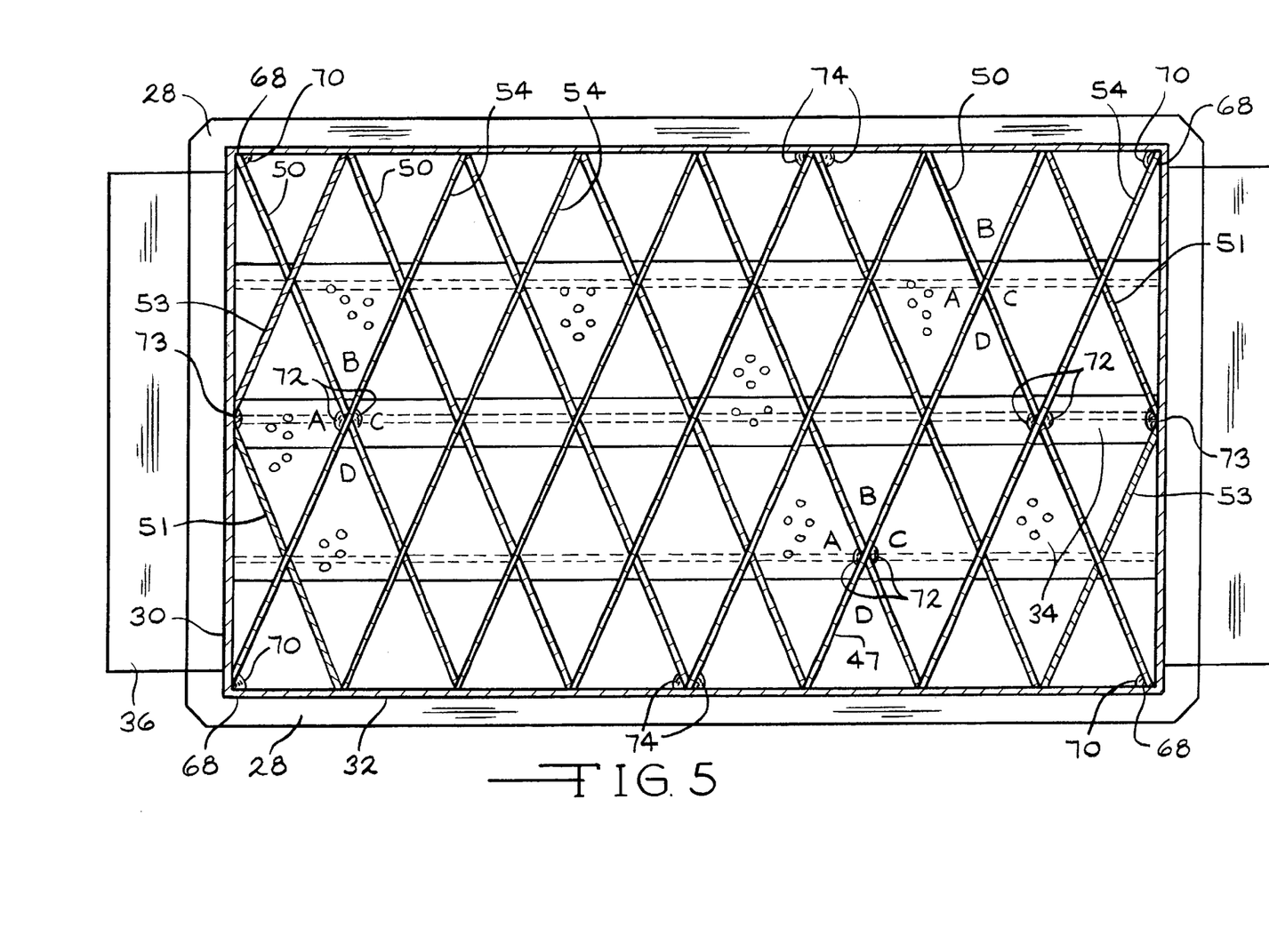
FIG. 5 is crossectional plan view of the bushing shown in FIGS. 2A and 4 along plane 5—5 shown in FIG. 4.

Referring to FIGS. 2A, 4 and 5, the bushing 26, having about 4030 tips 40, has a mounting flange 28 extending entirely around the top of the bushing and welded to endwalls 30 and sidewalls 32. A screen 34 is the same as in the prior art bushings. The bushing 26 has an electrical terminal 36 welded to each the exterior surface of each of the end walls 30. An orifice or tip plate 38, containing double rows of tips 40, is welded to the lower ends of the sidewalls 32 and endwalls 30. Finned cooling tubes 42 and double finned cooling tubes 44 with ceramic supports 46 are used to cool the tips and support the underside of the orifice plate 38 in operation of the bushing 26 in the same manner as in prior art bushings. The ceramic supports can be any refractory material that does not react with a platinum-rhodium alloy at temperatures in the range of 1900–2300 degrees F. and that has good hot load resistant at these temperatures such as aluminum oxide, mullite, other known high alumina refractory and other known refractories for use in these conditions.

The tips 40 are arranged in double rows and are just like the prior art tips. The inside diameter of the bore in the tip will depend on the type of glass being fiberized, the desired diameter of the fiber product and the capability of the fiber processing equipment being used as is well known in the art. While the bushing described here is a cooling tube type bushing, the invention is equally useful on all types of fiberizing bushings having an orifice or tip plate that tends to sag and creep in operation and which also use other means of cooling such as well known blade like fins, well known forced air cooling, or only ambient air cooling. The method of cooling the tips, orifice plate and molten glass emerging from the tips or orifices in the orifice plate is not critical to the present invention.

Referring to FIGS. 4, 5, 6, 6C, 7 and 7C, a diamond shaped support structure 47 of intersecting reinforcing members 50, 51, 53, and 54, welded to the side walls 32, the top surface of the orifice or tip plate 38 and to each other provide substantial superior support to the tip plate 38 which substantially reduces the rate of sag of the orifice or tip plate 38 when the bushing 26 is in operation making inorganic fiber.

Figures 6, 6A:
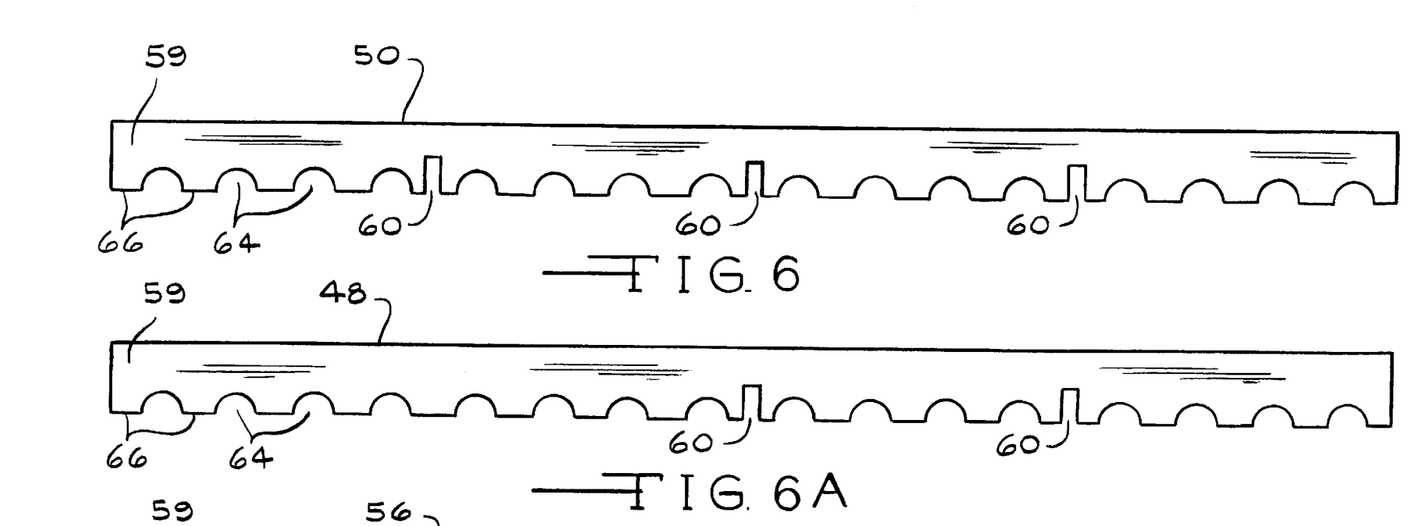
FIGS. 6, 6A, 6B, 6C 7, 7A, 7B and 7C are frontal views of internal reinforcing supports used in the bushings of the present invention.
Figures 6B, 6C:
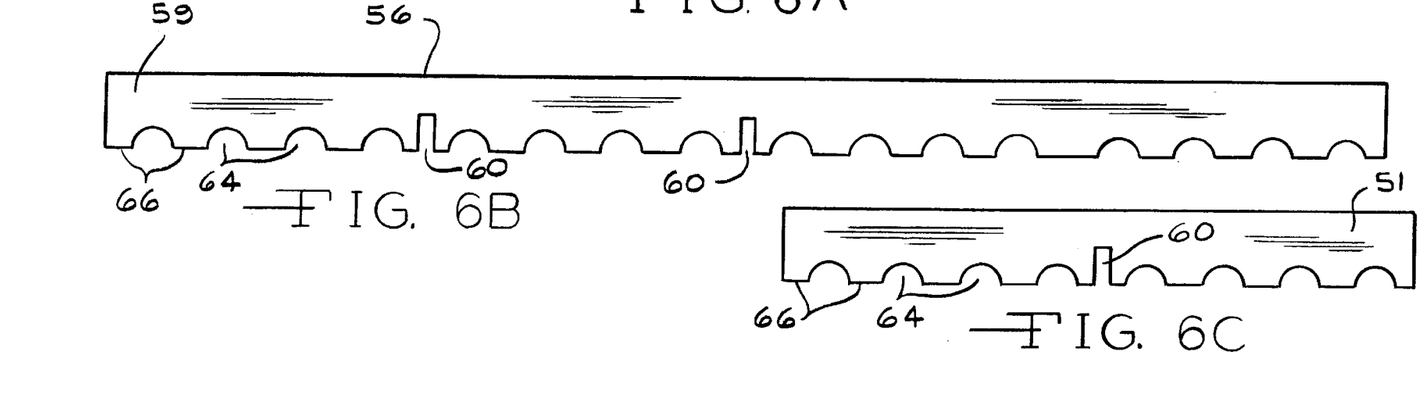
Figures 7, 7A:
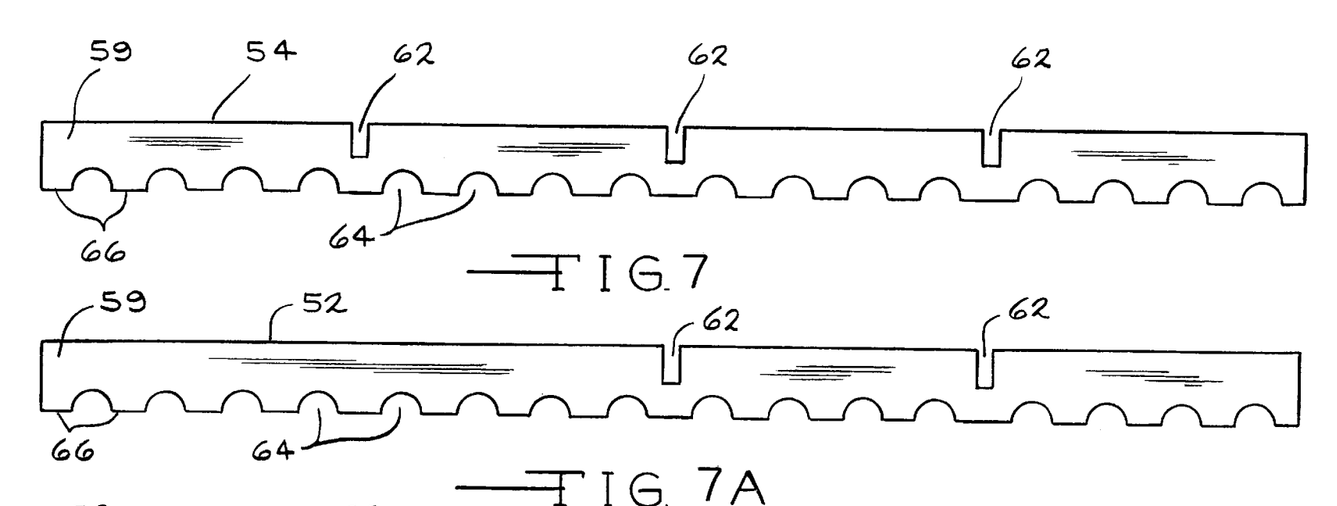
Figures 7B, 7C:
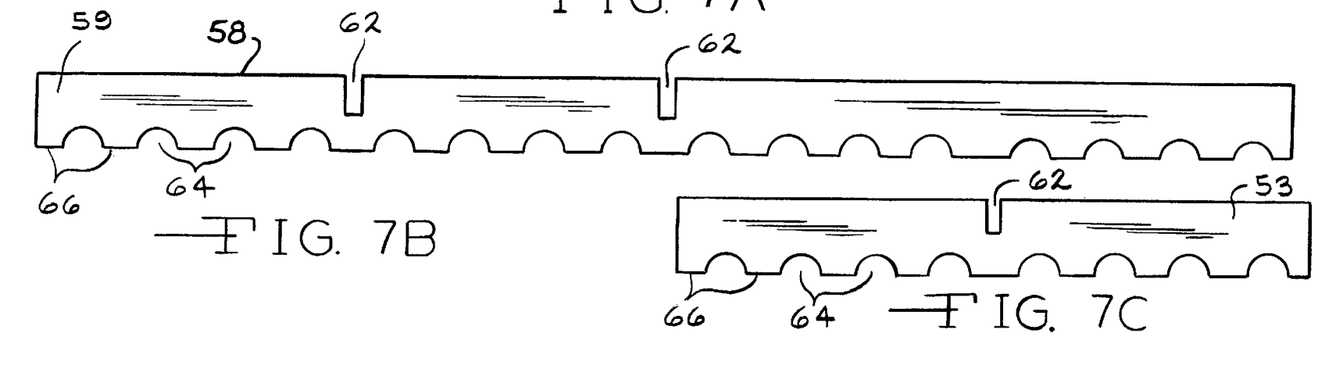

The diamond shaped support structure 47 of intersecting internal reinforcing members is formed by four different reinforcing support members 50, 51, 53, and 54 as shown in detail in FIGS. 6, 6C 7, and 7C. Supports 50 are shown in detail in FIG. 6, and supports 54 are is shown in FIG. 7. Short supports 51 are shown in detail in FIG. 6C and short supports 53 are shown in FIG. 7C.

Each of the internal reinforcing members, internal supports, 50 and 54 are preferably made from platinum-rhodium alloy bars 59 having cutouts 64, preferably semi-circular or arched, spaced apart on the lower edge to span the double rows of orifices in the orifice plate 38, with feet 66 on both sides of each cutout 64. The supports are welded to the top surface of the tip plate 38 along the feet 66. The short supports 51 and 53 are made and attached to the tip plate 38 in the same manner. In this preferred embodiment, the internal supports that are parallel to each other are spaced apart about two inches apart, although spacings of up to about four inches would still be effective. Smaller spacings than two inches will be cost effective when the prices of the precious metals used for the internal supports are in the lower quartile or so of their price ranges.

The type of alloy, length, height and thickness of the supports 50, 51, 53 and 54 can vary considerably depending on the size of the bushing and sometimes on the prices of rhodium and platinum, but in the preferred embodiment the bars are a nominal 80 platinum-20 rhodium alloy and the thickness of the bars is about 0.04 inch, the height about 0.5 inch and the length about 9.97 inches. Zirconia or thoria or other refractory dispersion strengthened platinum-rhodium alloy or platinum can also be used as the alloy in making the supports 50, 51, 53 and 54.

The supports 50 and 51 also have at least one open slot 60 in their lower portion extending up about one-half the height of the support corresponding to the locations where these supports cross one or both of supports 53 and 54. The supports 54, and 53 have at least one open slot 62 in their top portion extending down about one-half of their height corresponding to the locations that these supports cross the supports 50 and/or 51. The slots 60 and 62 allow the supports to cross one another while maintaining a consistent height for the diamond support structure 47.

At every location where support bars 50, 51, 53 and 54 intersect, cross, one another four angles, angles A, B. C, and D, are formed. Two of the angles, in this embodiment angles A and C, are significantly greater than 90 degrees and two of the angles, in this embodiment angles B and D, are significantly less than 90 degrees, preferably between about 40–80 degrees, most preferably about 50–70 degrees such as about 60 +/−5 degrees. Angles A and C would be the same and would be 180 degrees minus angle B or angle D. Preferably the angles greater than 90 degrees, angles A and C, face an end wall of the bushing and the angles less than 90 degrees face a sidewall of the bushing.

It is preferred that a support enter each of the inside four corners 68 of the bushing, a corner being defined as the angle formed by a side wall 32 contacting an end wall 30 adjacent and near the orifice or tip plate 38. This arrangement provides optimum distribution of electrical power down the length of the bushing for uniform heating of the bushing by electrical resistance. If the supports 50 and 54 contact the endwalls without entering each of the inside four corners of the bushing, these supports tend to drain power away from the corners of the bushing making the corners colder and causing fiberizing problems.

The supports 50 and 54 that enter the inside corners 68 of the bushing are welded in place at the side walls with fillet welds 70 as shown in FIG. 5. All of the supports 50, 51, 53 and 54 are also welded on both sides to the orifice or tip plate 38 along both sides of each of the feet 66 on the bottom edges of the supports, in the wide angles A and C of each intersection as shown by the fillet welds 72 and to the side walls with fillet welds 74. Supports 51 and 53 are also welded to each end wall 30 with a fillet weld 73. The fillet welds 70, 72, 73 and 74 begin at the top of the supports and extend down as far as practical, but need not extend all the way to the bottom edge of the supports. A center portion of the screen 34 (FIG. 2A) sets on top edges of the supports 50, 51, 53 and 54 down the center portion of the length of the bushing, but is not welded to the supports. The screen 34 is welded continuously to the top edges of the endwalls 30 and the sidewalls 32. When bushings of the present invention are removed after months of operation, it is noted that the screen is welded to the tops of the supports, apparently by diffusion welding in operation at operating temperature.

Figure 9:
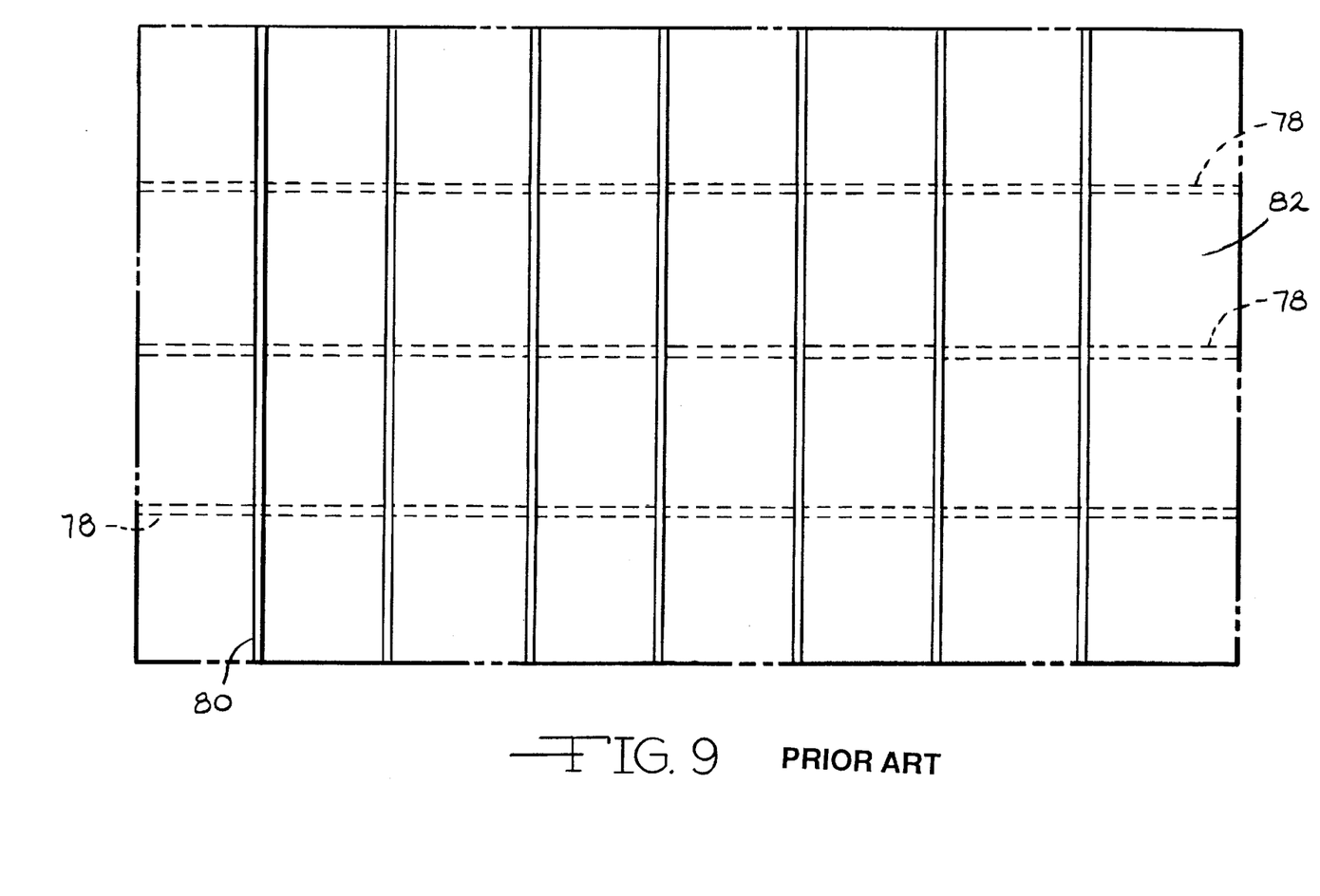
FIG. 9 is a sketch showing the support pattern for the tip plate of the typical prior art bushing of FIGS. 1, 2, and 3 showing the combination of external linear supports beneath the tip plate (orifices and tips not shown) and the internal reinforcing supports.
Figure 10:
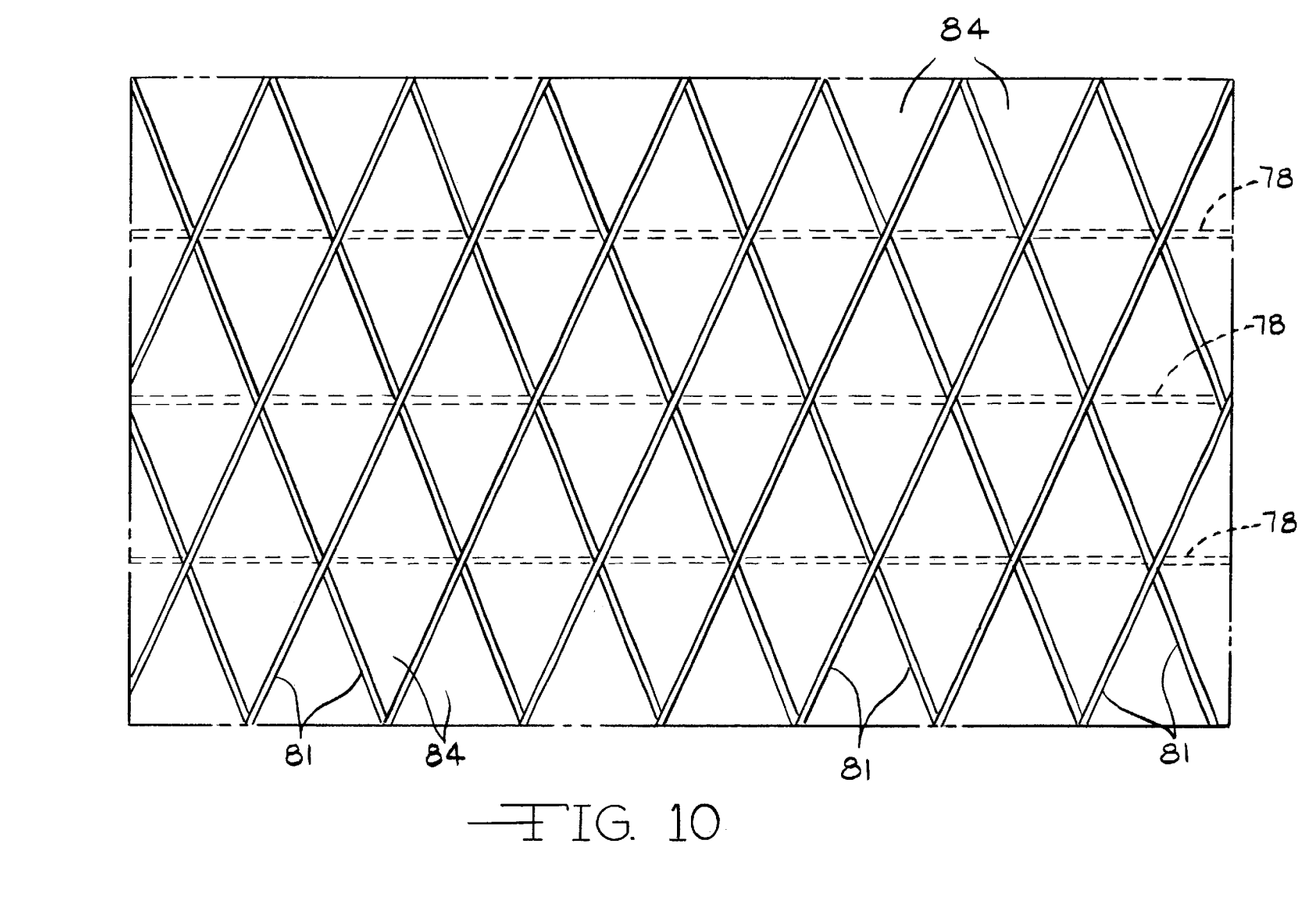
FIG. 10 is a sketch showing the support pattern for the tip plate of the preferred inventive bushing of FIGS. 2A, 4, and 5 showing the combination of external linear supports beneath the tip plate (orifices and tips not shown) and the internal reinforcing supports mounted to the top surface of the tip plate.

FIG. 10 is a sketch showing the supported areas and the unsupported areas of the tip plate 38 in the preferred bushing of the present invention shown in FIGS. 2A, 4 and 5. Diamond shaped unsupported areas 84 are bounded by internal linear support areas 80 provided by the internal supports 50, 51, 53 and 54 and external linear support areas 78 provided by the ceramic strips 46. The bushings of the present invention having diamond shaped unsupported areas of tip plate retain much more of their original integrity than prior art bushings having rectangular or square shaped unsupported areas 82 of tip plate as shown FIG. 9. In the typical prior art bushing, the unsupported square or rectangular areas 82 made bounded by internal support areas 80 provided by prior art internal supports and external linear support areas 78 provided by the ceramic strips 22.

The triangular shaped unsupported areas 84 (see FIG. 10) of the tip plate in the bushings according to the present invention are much more resistant to creep than the square or rectangular unsupported areas 82 of tip plate of the typical prior art bushing shown in FIG. 9. As a result, the bushings of the present invention maintain the orifice or tip plate 38 and the bottom edges of the tips 40 in their original alignment longer than in the prior art bushings producing a greater average fiberizing efficiency over the life of the bushing.

Figure 5A:
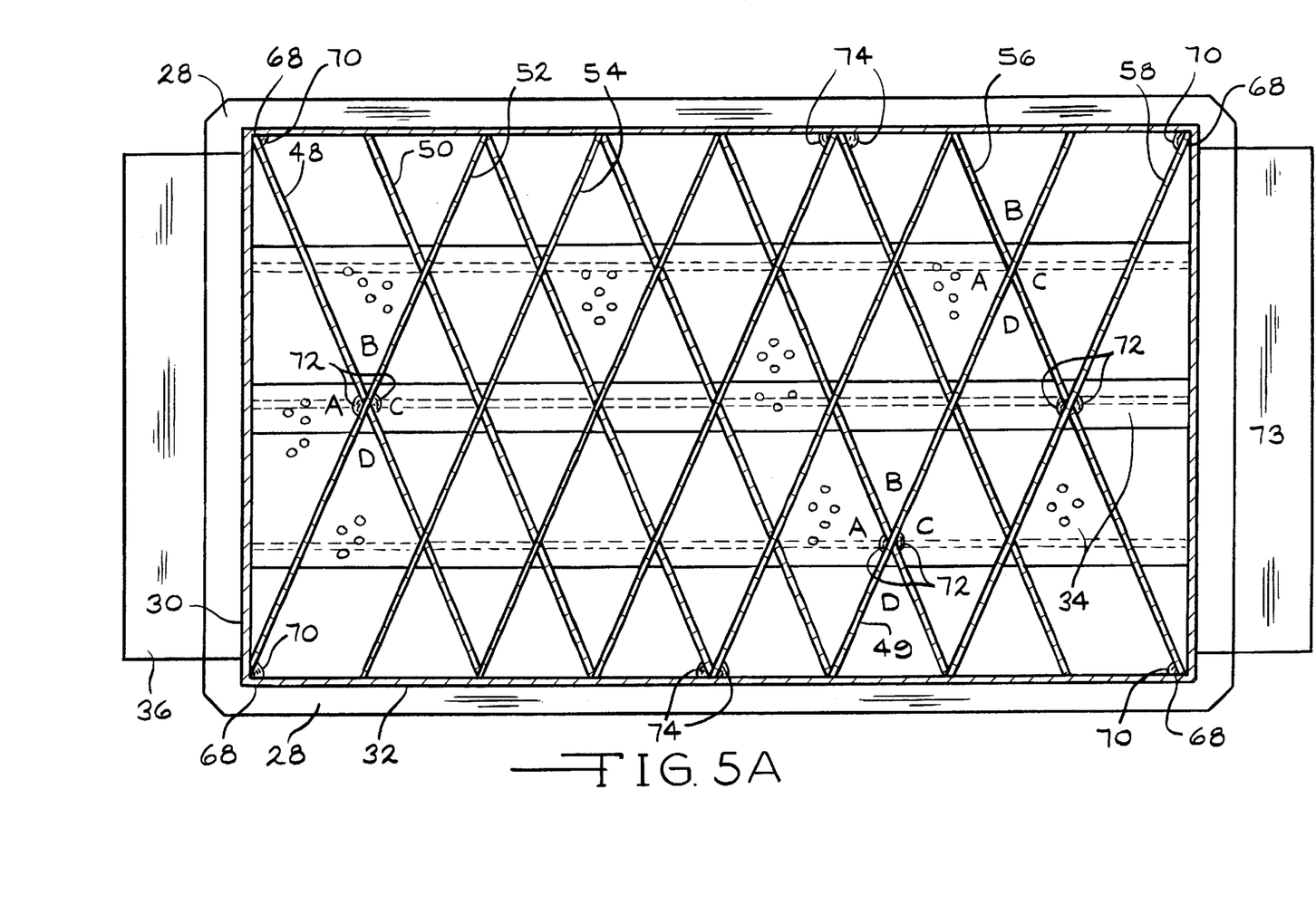
FIG. 5A is crossectional plan view of an optional modification of the preferred inventive bushing shown in FIGS. 2A and 4–5.

The supports 51 and 53 shown in FIGS. 6C and 7C are optional and need not be used as illustrated in an optional embodiment shown in FIG. 5A. This embodiment is the same as the preferred embodiment described above except that the short supports 51 and 53 were not used and this allows the use of different supports 48 shown in FIG. 6A, 56 shown in FIG. 6B, 52 shown in FIG. 7A and 58 shown in FIG. 7B. FIG. 5A shows how these supports are arranged to form a diamond shaped support structure 49. The supports are welded in the same relative locations as in the preferred embodiment.

The diamond shaped reinforcing structure 47 could also be made with a combination of long bars and short bars (not shown) each having no slots, the long bars and the short bars being welded together at their intersections with each other in the same or similar manner as described herein. Some of the supports in the resulting diamond shaped structure would be continuous and the others would be discontinuous but for the welds to the intersecting supports.

Figure 8:
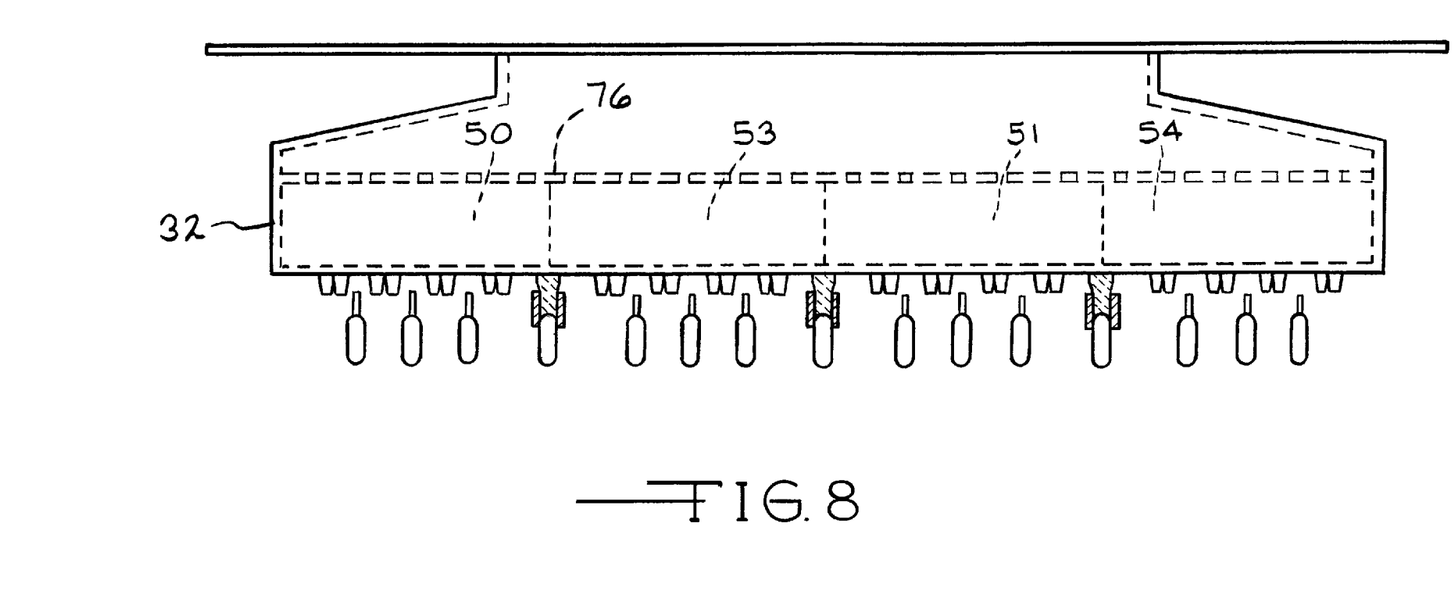
FIG. 8 is an end view of another bushing embodiment made according to the present invention.

FIG. 8 shows another embodiment of the present invention. The only difference in this bushing and the bushings of FIGS. 4–7C is that the screen 76 is planar and lies flat on top of the top edges of the support bars 48, 50, 52, 54, 56 and 58. The screen 76 is not welded to the support bars, but is welded continuously to the sidewalls 32 and the endwalls 30. Bushings made with this modification should perform in a similar manner to the preferred embodiment of the bushing.

The fiberizing bushings of the present invention are used to make fibers from molten materials, such as molten glass, in place of the fiberizing bushings in any known fiberizing process using fiberizing bushings such as disclosed in U.S. Pat. Nos. 5,935,289, 4,551,160, 4,411,180, 4,194,896, 3,869,268, the disclosures of which are incorporated herein by reference, and other similar fiberizing processes.

It will be obvious to bushing artisans that the diamond shaped support structure can be modified in several ways such as by using more or fewer support bars having different angles of intersection, by using curved or bowed support bars instead of straight support bars, by the use of a honeycomb like shape support and by many other changes. All of these modifications are within the concept and scope of the present invention so long as elements of the support structure engage each inside corner of the bushing adjacent and near the orifice or tip plate of the bushing as reflected in the following claims.

What is claimed is:

1. A bushing for fiberizing a molten material at temperatures above 1900 degrees F. comprising endwalls, sidewalls, an orifice plate or tip plate attached to the sidewalls and endwalls to form a boxlike shape having at least four interior corners, a support structure welded to the sidewalls and to a top surface of the orifice plate or tip plate for supporting the orifice plate or tip plate, and a screen mounted in the bushing above the support structure; the improvement comprising that the support structure comprises a plurality of intersecting or crossing internal supports with angles between the intersecting supports at each intersection or crossing, two of the angles being greater than about 110 degrees and two of the angles being significantly smaller than about 80 degrees.

2. The bushing of claim 1 wherein the support structure comprises diamond shapes and attached to the sidewalls.

3. The bushing of claim 2 wherein supports which are part of the diamond shaped support structure enter the interior corners of the bushing.

4. The bushing of claim 3 wherein a screen is attached to the sidewalls and/or end walls and lays on at least a portion of the top of the diamond shaped support structure, said portion being a center portion down the length of the bushing, said portion including a row of a plurality of intersections of the tops of supports making up the support structure.

5. The bushing of claim 4 wherein two of said angles are in the range of about 50–70 degrees and each internal support is within about three inches of another parallel internal support.

6. The bushing of claim 4 wherein two of said angles are in the range of about 55–65 degrees and each internal support is within about two inches of another parallel internal support.

7. The bushing of claim 3 wherein two of said angles are in the range of about 40–80 degrees and each internal support is within about four inches of another parallel internal support.

8. The bushing of claim 3 wherein two of said angles are in the range of about 45–75 degrees and each internal supports within about two inches of another parallel internal support.

9. The bushing of claim 2 wherein a screen is attached to the sidewalls and/or end walls and lays on at least a portion of the top of the support structure, said portion being a center portion down the length of the bushing, said portion including a row of a plurality of intersections of the tops of supports making up the support structure.

10. The bushing of claim 9 wherein said interior diamond shaped support structure is attached to both the sidewalls and the endwalls and wherein supports which are part of the diamond shaped support structure enter the interior corners of the bushing.

11. The bushing of claim 10 wherein two of said angles are in the range of about 50–70 degrees and each internal support is within about two inches of another parallel internal support.

12. The bushing of claim 9 wherein two of said angles are in the range of about 40–80 degrees and each internal support is within about four inches of another parallel internal support.

13. The bushing of claim 9 wherein two of said angles are in the range of about 45–75 degrees and each internal support is within about three inches of another parallel internal support.

14. The bushing of claim 9 wherein two of said angles are in the range of about 50–70 degrees and each internal support is within about two inches of another parallel internal support.

15. The bushing of claim 2 wherein two of said angles are in the range of about 45–75 degrees and each internal support is within about two inches of another parallel internal support.

16. A method for fiberizing a molten material at temperatures above 1900 degrees F. comprising passing the molten material through a bushing comprising endwalls, sidewalls, an orifice plate or tip plate attached to the side walls and end walls to form a boxlike shape having at least four interior corners, internal supports welded to the side walls and to a top surface of the orifice plate or tip plate for supporting the orifice plate or tip plate and a screen mounted in the bushing above the internal supports; the improvement comprising interior supports forming a structure comprising a plurality of intersecting or crossing internal supports with angles between the intersecting supports at each intersection or crossing, two of the angles being greater than about 110 degrees and two of the angles being significantly smaller than about 80 degrees.

17. The method of claim 16 wherein the structure comprises diamond shapes attached to the sidewalls.

18. The method of claim 17 wherein an internal support which is part of the diamond shaped support structure enters each of the interior corners of the bushing.

19. The method of claim 18 wherein a screen is attached to the sidewalls and/or end walls and lays on at least a portion of the top of the diamond shaped support structure, said portion being a center portion down the length of the bushing, said portion including a row of a plurality of intersections of the tops of supports making up the support structure.

20. The method of claim 19 wherein two of said angles are in the range of about 55–65 degrees and each internal support is within about two inches of another parallel internal support.

21. The method of claim 18 wherein two of said angles are in the range of about 40–80 degrees and each internal support is within about four inches of another parallel internal support.

22. The method of claim 18 wherein two of said angles are in the range of about 45–75 degrees and each internal support is within about three inches of another parallel internal support.

23. The method of claim 18 wherein two of said angles are in the range of about 50–70 degrees and each internal support is within about three inches of another parallel internal support.

24. The method of claim 18 wherein two of said angles are in the range of about 55–65 degrees and each internal support is within about two inches of another parallel internal support.

25. The method of claim 17 wherein a screen is attached to the sidewalls and/or end walls and lays on at least a portion of the top of the diamond shaped support structure, said portion being a center portion down the length of the bushing, said portion including a row of a plurality of intersections of the tops of internal supports making up the support structure.

26. The method of claim 25 wherein said interior diamond shaped support structure is attached to both the sidewalls and the endwalls and wherein supports which are part of the diamond shaped support structure enter the interior corners of the bushing.

27. The method of claim 22 wherein two of said angles are in the range of about 55–65 degrees and each internal support is within about two inches of another parallel internal support.

28. The method of claim 25 wherein two of said angles are in the range of about 40–80 degrees and each internal support is within about four inches of another parallel internal support.

29. The method of claim 25 wherein two of said angles are in the range of about 45–75 degrees and each internal support is within about four inches of another parallel internal support.

30. The method of claim 25 wherein two of said angles are in the range of about 50–70 degrees and each internal support is within about three inches of another parallel internal support.

31. The method of claim 25 wherein two of said angles are in the range of about 55–65 degrees and each internal support is within about two inches of another parallel internal support.

32. The method of claim 17 wherein two of said angles are in the range of about 45–75 degrees and each internal support is within about three inches of another parallel internal support.

33. The method of claim 17 wherein two of said angles are in the range of about 50–70 degrees and each internal support is within about three inches of another parallel internal support.

34. The method of claim 17 wherein two of said angles are in the range of about 55–65 degrees and each internal'support is within about two inches of another parallel internal support.

* * * * *